(12) United States Patent
Szepessy et al.

(10) Patent No.: US 9,193,382 B2
(45) Date of Patent: Nov. 24, 2015

(54) YAW RATE SIGNAL OFFSET CALCULATION

(75) Inventors: Imre Szepessy, Budapest (HU); Imre Benyó, Budapest (HU); Miklós Arányi, Budapest (HU); Dóra Szabolcs, Gyongyos (HU)

(73) Assignee: ThyssenKrupp Presta AG, Eschen (LI)

( * ) Notice: Subject to any disclaimer, the term of this patent is extended or adjusted under 35 U.S.C. 154(b) by 297 days.

(21) Appl. No.: 14/008,711

(22) PCT Filed: Mar. 31, 2011

(86) PCT No.: PCT/EP2011/001630
§ 371 (c)(1),
(2), (4) Date: Nov. 19, 2013

(87) PCT Pub. No.: WO2012/130259
PCT Pub. Date: Oct. 4, 2012

(65) Prior Publication Data
US 2014/0100741 A1    Apr. 10, 2014

(51) Int. Cl.
*B62D 6/00*        (2006.01)
*B62D 11/00*     (2006.01)
*B62D 12/00*     (2006.01)
*B63G 8/20*        (2006.01)
*B63H 25/04*     (2006.01)
*G05D 1/00*       (2006.01)
*G06F 7/00*        (2006.01)
(Continued)

(52) U.S. Cl.
CPC ............. *B62D 6/003* (2013.01); *B60T 8/17551* (2013.01); *B60T 8/885* (2013.01); *B62D 6/005* (2013.01); *B60T 2250/06* (2013.01); *B60T 2250/062* (2013.01); *B62D 6/00* (2013.01)

(58) Field of Classification Search
CPC .................................. B62D 6/00; B62D 6/003
USPC ..................................... 701/42; 180/444, 446
See application file for complete search history.

(56) References Cited

U.S. PATENT DOCUMENTS 4,470,124 A    9/1984  Tagami et al.
6,547,031 B1 *  4/2003  Magnus ................. B62D 5/003
                                                                    180/444
(Continued)

FOREIGN PATENT DOCUMENTS

DE    4130142 A1    3/1993
DE    19919860 C2   12/2001
(Continued)

OTHER PUBLICATIONS

International Search Report and Written Opinion issued in PCT/EP2011/001630, mailing date Jun. 17, 2011.
(Continued)

*Primary Examiner* — Helal A Algahaim
*Assistant Examiner* — Mahmoud Ismail
(74) *Attorney, Agent, or Firm* — Panitch, Schwarze Belisario & Nadel LLP

(57) ABSTRACT

A method of calculating the offset of a yaw rate signal may be based at least in part on signals representing pinion angle, wheel speed, and yaw rate. These signals may be determined, and threshold comparisons may be performed, and determination of the yaw rate signal may be based at least in part on the results of the threshold comparisons.

11 Claims, 1 Drawing Sheet

Figure 1:
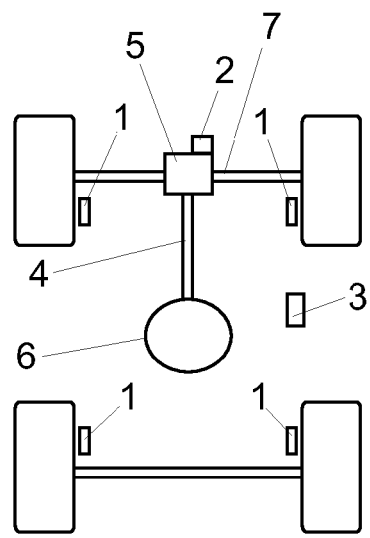

(51) Int. Cl.
  *G06F 17/00* (2006.01)
  *G06F 19/00* (2011.01)
  *B60T 8/1755* (2006.01)
  *B60T 8/88* (2006.01)
  *B62D 5/04* (2006.01)

(56) References Cited

U.S. PATENT DOCUMENTS

| | | | |
|---|---|---|---|
| 2002/0108805 A1* | 8/2002 | Card | B62D 6/003 180/446 |
| 2003/0051938 A1* | 3/2003 | Menjak | B62D 5/008 180/444 |
| 2008/0262678 A1* | 10/2008 | Nishimura | B62D 5/0472 701/42 |
| 2008/0277192 A1* | 11/2008 | Nishimura | B62D 5/0463 180/444 |
| 2012/0215406 A1* | 8/2012 | Tanimoto | B62D 15/025 701/42 |

FOREIGN PATENT DOCUMENTS

| | | |
|---|---|---|
| EP | 0471299 A2 | 2/1992 |
| EP | 1258708 A2 | 11/2002 |
| EP | 1264749 B1 | 12/2005 |

OTHER PUBLICATIONS

International Preliminary Report on Patentability issued in PCT/EP2011/001630, issue date Oct. 1, 2013.

* cited by examiner

YAW RATE SIGNAL OFFSET CALCULATION

CROSS-REFERENCE TO RELATED APPLICATIONS

This Application is a National Stage of PCT International Application No. PCT/EP2011/001630, filed on Mar. 31, 2011. The disclosures of the aforementioned applications are incorporated herein in their entirety by reference.

The present invention relates to a method for calculating the offset of a yaw rate signal, which is provided by a yaw rate sensor in a motor vehicle.

The yaw rate is the angular speed of the movement of a vehicle round its vertical axis. Driver assistance systems use the yaw rate for example to compare the angular velocity, which is due to the radius of a curve and the vehicle speed, to an actual yaw rate. Any deviation from the expected yaw rate may be due to the loss of control of the driver, which may then be corrected, if possible, by the assistance system.

Yaw rate sensors are therefore important sensors in modern vehicles.

In the control of electric power assisted steering systems for road vehicles, yaw sensors can be used to control the steering system. A simple function may be to compare the centre position of the steering system, in which a vehicle should drive in straight line, with the actual yaw rate which should in this case be zero (0).

Generally, and especially in the implementation mentioned above, it is desirable to know the offset of the yaw rate sensor in the vehicle. The offset is defined as the deviation of the yaw rate sensor signal from 0 when the vehicle is at rest.

German document DE19919860C2 describes a method to calculate the offset of a steering angle sensor signal by comparing a the difference between an expected and a measured yaw rate signal at rest with the respective difference in the yaw rate signal when the vehicle is moving. The offset of the yaw rate sensor and its variation over time during the use of the vehicle is not precisely determined.

In German Offenlegungsschrift DE4130142A1 there is disclosed a system for calculating the offset of a steering angle sensor. The calculation is initialized only when high vehicle speeds and small steering angles are sensed. The system then assumes that the vehicle is travelling in a straight line. There is no precise offset calculation for yaw rate signal sensors disclosed.

It is known from U.S. Pat. No. 4,470,124 that the offset of yaw rate sensors can be calculated on the basis of the average yaw rate signal value. The yaw rate signal changes between positive and negative values. In practise, the average over time should be zero. Any deviation from zero of the averaged yaw rate is taken as a sensor offset. This method is not very precise. Furthermore, there are methods to perform temperature based offset compensation in yaw rate signals. The offset, however, is not only influenced by temperature, but also for example by aging and other factors.

It is known from European Patent EP 1264749B1 to compensate a vehicle yaw rate measuring system, in which the system has a yaw rate sensor and low frequency parts of the signal are filtered out of the signal of the yaw rate sensor. The system is compensated only during time periods in which the filtered signal does not exceed a predetermined amount in a predetermined period of time. These conditions apply when the vehicle is at rest or travelling in a straight-ahead direction. There is no disclosure relating to the means and methods applied to determine the standstill of the vehicle.

It is therefore an object of the present invention, to provide a method for determining the offset of a yaw rate sensor signal in a vehicle with high precision, especially to provide a method to determine the offset repeatedly during the use of a vehicle.

This object is achieved by a method with the features of claim 1.

The method is carried out in an electronic system of an automobile which comprises a control unit, an electrically powered or assisted rack and pinion steering with a steering or pinion angle sensor which generates a pinion angle speed signal p, wheel speed sensors associated with at least one road wheel which generate at least one wheel speed signal w, and a yaw rate sensor which generates a yaw rate signal y. The method comprises the following steps:

a. Observing the pinion angle signal p, the at least one wheel speed signal w, and the yaw rate signal y, for a time t;

b. If the pinion angle speed signal p is below a threshold pmax, and the wheel speed signal w is below a threshold wmax, and the yaw rate signal y is below a threshold ymax, then start a waiting first time period t1;

c. If after the first time period t1 the signals p, w and y are still below their thresholds, then start a calculation of the yaw rate offset yo during a threshold second time period t2, wherein the average yaw rate ya is acquired during this second time period t2; and d. If during the second time period t2 the signals p, w and y remain below their thresholds, then the acquired average yaw rate ya is stored as yaw rate offset yo;

e. If the signals p, w and y still remain below their thresholds, then proceed to step c, if at least one of the signals p, w and y exceeded the respective thresholds, then proceed to step a.

In an preferred embodiment it was possible that the proceeding of the offset calculation method following to step e is interrupted for a threshold third time period t3. With other words: If the signals p, w and y still remain below their thresholds, then after a threshold third time period t3 is passed proceed to step c and/or if at least one of the signals p, w and y exceeded the respective thresholds, then after a threshold third time period t3 is passed proceed to step a.

This method enables the control unit to determine the yaw rate offset yo repeatedly and with great precision while the vehicle is in use, thus taking into account temperature drift and the like. The re-calculation of the value yo is carried out every time when the three signals are below their respective thresholds for a time t which is at least the sum of the first time period and the second time period t1+t2.

The signals p, w and y can be filtered, if necessary.

There may be more than one wheel speed sensor. In this case, the signal w is the sum of the wheel speeds, for example of two wheel of the same axle, or the sum of four wheel speeds. In this case, the threshold wmax is the upper limit for the sum of the wheel speeds.

Suitable values for the limits or thresholds pmax, wmax and ymax may be:
pmax=20 degrees per second (dps), preferably 10 dps;
wmax=1.0 revolutions per minute (rpm), preferably 0.5 rpm; and
ymax=20 degrees per second (dps), preferably 10 dps, and more preferably 1 dps.

In the context of this specification, the term "degrees" refers to angles, i.e. 1/360 of a full circle, and not to temperature.

The first time period t1 may be 1 second, and the second time period t2 may be 0.1 seconds. In the context of this specification, the term "t1" refers to the first time period and the term "t2" refers to the second time period. The third time period may be 1 second or 10 seconds.

Figure 2:
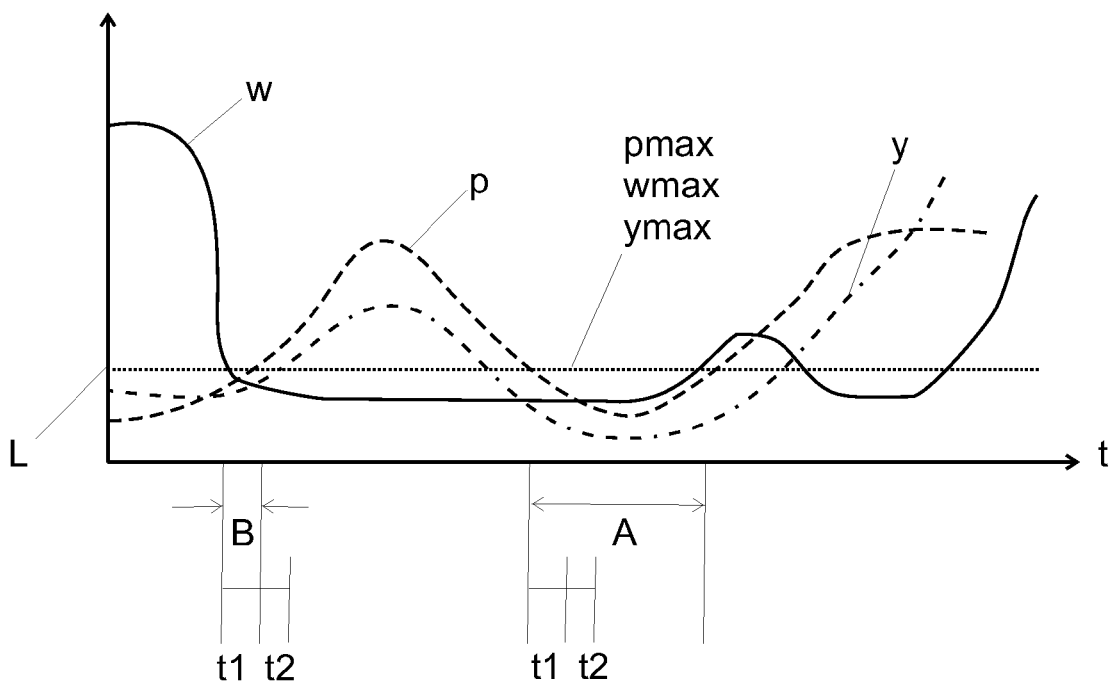

An exemplary embodiment of the present invention is described in greater detail below on the basis of the drawing, in which:

FIG. 1: shows a motor vehicle with an electronic steering system and sensors in a diagrammatic representation; and FIG. 2: shows a set of curves of sensor signals over time with applicable thresholds or limits and representative time intervals.

FIG. 1 shows in diagrammatic form a motor vehicle with four road wheels, four wheel speed sensors 1, a pinion angle sensor 2 and a yaw rate sensor 3. The vehicle is equipped with a steering system with a steering shaft 4 and a gear box 5. The steering shaft 4, at its upper end, holds a steering wheel 6 and at its lower end a steering pinion (not shown). An electric servo motor and an appropriate The steering pinion meshes with teeth of a toothed rack 7, so that, when the steering wheel 6 is turned, the toothed rack 7 is displaced in its axial direction. Track rods are attached to both ends of the toothed rack 7 and are connected to steering knuckles (not illustrated), which in turn carry steered wheels. A rotation of the steering wheel 6 thus leads, in a known manner, to pivoting of the steered wheels.

The motor vehicle is equipped in a generally know manner with an electronic system which comprises a control unit (ECU). The electrically powered or assisted rack and pinion steering, the wheel speed sensors 1, the steering or pinion angle sensor 2, and the yaw rate sensor 3 are connected to the control unit and are part of the electronic system.

In use, the steering or pinion angle sensor 2 generates an analog or digital pinion angle speed signal p, wheel speed sensors 1 generate at least one wheel speed signal w, and yaw rate sensor 3 generates a yaw rate signal y.

FIG. 2 shows a set of curves of sensor signals p, w and y over time t with applicable thresholds or limits and representative time periods t1 and t2. The threshold are normalized to an arbitrary value which is represented by the dotted line L. For each signal, the value of L is set as described above.

Now in use, time is running continuously and the ECU monitors the sensor signals p, w and y. This is method step a as described above.

As soon as all three signals, p, w and y, fall below their respective thresholds pmax, wmax and ymax, which are represented by the line L in FIG. 2, the ECU proceeds to step b as explained above, namely the ECU wait for a timeperiod T1 and continues to monitor the signals p, w and y.

If during t1 the signals remain below their thresholds or do not exceed their thresholds, which is equivalent, the ECU proceeds to step c. In this step, the ECU continues to monitor the signals p, w and y and in addition collects and averages the signal y to generate an average yaw rate ya during a timeperiod t2. If during t2 the signals remain below their thresholds or do not exceed their thresholds, which is equivalent, the ECU proceeds to step d. The value ya is then assumed as a valid value which is not disturbed by external influence and therefore ya can be taken as very precise value for the yaw rate signal offset, designated yo. The precision of this value, as measured according to the present invention, may even be 1 angular degree per second or better.

If, however, only one of the signals, p, w or y, exceeds the threshold, ya is cancelled and the method returns to step a because the detrimental external influence would leave ya too erroneous.

If, after t2 has lapsed, the signals remain below their thresholds or do not exceed their thresholds, the method may directly go to step c again and calculated a new value ya.

In the example at FIG. 2 is shown as the signals p, w and y are less than the threshold values (shown as L) during time interval A and during the time interval B. The time interval A is longer than the sum of the first and second time periods t1+t2. As result the offset value yo for the yar rate signal y is calculating on basis of the average yaw rate signal during the time period A. The time interval B is shorter than the sum of the first and second time periods T1+t2. Therefore during the time interval B no offset value of the yaw rate is calculating.

Using this method, the offset yo can be determined as soon as the external conditions are favourable. External influences can be taken into account. One of the influences, which might have to be explained in detail, is the pinion angular speed p. Setting an upper limit pmax on this value means that a yaw rate error can be eliminated, which can occur even during standstill by turning the steering wheel and thus the wheels of the vehicle, which can lead to a yaw movement of the vehicle.

Thus, offset values are determined extremely precisely using the method as described above. Performing this calculation repeatedly enables the system to compensate for temperature changes and the like, which in the use of a motor vehicle necessarily arise frequently and on short time scales within seconds and on long time scales within minutes or even hours.

What is claim is:

1. A method for calculating the offset of a yaw rate signal, which is provided by a yaw rate sensor in a motor vehicle, the method being implemented in an electronic system of an automobile which comprises a control unit, an electrically powered or assisted rack and pinion steering with a steering or pinion angle sensor which generates a pinion angle speed signal, wheel speed sensors associated with at least one road wheel which generate at least one wheel speed signal, and a yaw rate sensor which generates the yaw rate signal, the method comprising:
   a. observing the pinion angle speed signal, the at least one wheel speed signal, and the yaw rate signal, for a time;
   b. starting a waiting time if the pinion angle speed signal is below a pinion angle speed signal threshold, the wheel speed signal is below a wheel speed signal threshold, and the yaw rate signal is below a yaw rate signal threshold;
   c. starting a calculation for a time of a yaw rate offset if, after the waiting time, the pinion angle speed, wheel speed, and yaw rate signals are still below their respective thresholds, wherein the starting the calculation of the time of the yaw rate offset includes acquiring an average yaw rate for a predetermined time period; and
   d. storing the average yaw rate as the yaw rate offset in the control unit if, during the predetermined time period, the pinion angle speed, wheel speed, and yaw rate signals remain below their respective thresholds;
   e. determining if the pinion angle speed, wheel speed, and yaw rate signals still remain below their thresholds, and if so, then proceeding to c, or if at least one of the pinion angle speed, wheel speed, or yaw rate signals exceeded its respective threshold, then proceeding to a.

2. The method of claim 1, further comprising filtering one or more of the pinion angle speed, wheel speed, and/or yaw rate signals using one or more low pass filters.

3. The method of claim 1, wherein more than one wheel speed sensors are provided, and wherein the wheel speed signal is a sum of wheel speeds detected by the more than one wheel speed sensors.

4. The method of claim 3, wherein the wheel speed signal threshold is defined as an upper limit for the sum of the wheel speeds.

5. The method of claim 1, wherein the pinion angle speed signal threshold is 20 degrees per second.

6. The method of claim 1, wherein the pinion angle speed signal threshold is 10 degrees per second.

7. The method of claim 1, wherein the wheel speed signal threshold is 1.0 revolutions per minute.

8. The method of claim 1, wherein the wheel speed signal threshold is 0.5 revolutions per minute.

9. The method of claim 1, wherein the yaw rate signal threshold is 20 degrees per second.

10. The method of claim 1, wherein the yaw rate signal threshold is 0.1 degrees per second.

11. The method of claim 1, wherein the waiting time is not less than one second and the predetermined time period is not less than 0.1 second.

\* \* \* \* \*